United States Patent [19]
Hoch et al.

[11] Patent Number: 6,002,520
[45] Date of Patent: Dec. 14, 1999

[54] ILLUMINATION SYSTEM FOR CREATING A DESIRED IRRADIANCE PROFILE USING DIFFRACTIVE OPTICAL ELEMENTS

[75] Inventors: John S. Hoch, Santa Clara; Annette C. Grot, Cupertino, both of Calif.

[73] Assignee: Hewlett-Packard Company, Palo Alto, Calif.

[21] Appl. No.: 08/843,101

[22] Filed: Apr. 25, 1997

[51] Int. Cl.⁶ ............... G02B 27/44; G02B 5/18; G02B 5/32; G02B 27/10

[52] U.S. Cl. ............ 359/565; 359/599; 359/619; 359/15; 359/20

[58] Field of Search .................... 359/565, 569, 359/570, 571, 574, 575, 576, 599, 619, 9, 15, 16, 19, 20, 29

[56] References Cited

U.S. PATENT DOCUMENTS

| | | | |
|---|---|---|---|
| 2,275,602 | 3/1942 | Beck et al. | 359/599 |
| 3,547,546 | 12/1970 | Schier | 359/565 |
| 4,230,941 | 10/1980 | Stauffer | 359/619 |
| 4,918,583 | 4/1990 | Kudo et al. | 359/619 |
| 5,218,471 | 6/1993 | Swanson et al. | 359/565 |
| 5,319,496 | 6/1994 | Jewell et al. | 359/619 |
| 5,499,138 | 3/1996 | Iba | 359/569 |

FOREIGN PATENT DOCUMENTS

| | | | |
|---|---|---|---|
| 654924 | 3/1979 | U.S.S.R. | 359/619 |

OTHER PUBLICATIONS

Hoch, John S. et al., "Diffractive spot–Array Generation Using Multimode Surface–Emitting Lasers and Light–Emitting Diodes", Diffractive Optics and Micro–Optics, vol. 5 of 1996 OSA Technical Digest Series (Optical Society of American, Washington, DC, Apr. 29–May 2, 1996, pp. 71–74.

*Primary Examiner*—Jon Henry
*Attorney, Agent, or Firm*—Ian Hardcastle

[57] ABSTRACT

An illumination system that comprises a light source, and, disposed in an optical path between the light source and the surface, converging imaging optics, and a diffractive array generator. The diffractive array generator preferably includes a two-dimensional periodic array of multi-level topological features.

20 Claims, 3 Drawing Sheets

ILLUMINATION SYSTEM FOR CREATING A DESIRED IRRADIANCE PROFILE USING DIFFRACTIVE OPTICAL ELEMENTS

FIELD OF THE INVENTION

The invention relates to an illumination system for efficiently illuminating an object with a desired irradiance profile. In particular, the invention relates to such a system that creates the desired irradiance profile using an incoherent light source, reflective, refractive or diffractive imaging optics and a diffractive array generator.

BACKGROUND OF THE INVENTION

Such applications as document scanners, free-space optical interconnections, and optical displays require simple, compact and efficient illumination systems that can illuminate an object with a desired irradiance profile using a narrowband and spatially-incoherent light source. Such light sources are lower in cost than coherent light sources, such as lasers. Energy efficiency is important in all applications, since the cost of the power supply that powers the light source can be a major factor in the cost of making such devices. In portable devices, energy efficiency is of paramount importance because of battery size and battery life considerations.

Some types of known manually-operated document scanners illuminate the document using one or more LEDs. LEDs generate a non-uniform irradiance profile, but the document needs to be illuminated with a uniform irradiance profile. A uniform irradiance profile is derived from the non-uniform irradiance profile of the LEDs by interposing a suitably-shaped stop between the LEDs and the document. With this arrangement, the document is illuminated by the small segment of the light output of the LEDs in which the profile is acceptably uniform. The uniform irradiance profile is therefore obtained at the expense of low efficiency, since most of the light generated by the LEDs is absorbed by the stop, and does not illuminate the document.

Techniques for shaping the irradiance profile of a coherent light source using refractive and diffractive optics are known in the art. For example, a way of using two aspheric lenses to shape a coherent and collimated Gaussian beam into a rectangular and uniform irradiance profile is described in U.S. Pat. No. 3,476,463. Other examples of using refractive systems to reshape Gaussian beams are described by P. W. Rhodes and D. L. Shealy in *Refractive Optical Systems for Irradiance Redistribution of Collimated Radiation: Their Design and Analysis,* 19 APPL. OPT., 3545–3553 (1980) and by C. Wing and D. L. Shealy in *Design of Gradient-Index Lens Systems for Laser Beam Reshaping,* 32 APPL. OPT., 4763–4769 (1993). Examples of diffractive systems are described by M. T. Eismann, A. M. Tai, and J N. Cederquist in *Iterative Design of a Holographic Beam-Former,* 28 APPL. OPT., 2641–2650 (1989) and by N. C. Roberts in *Multilevel Computer-Generated Holograms with Separable Phase Functions for Beam Shaping,* 31 APPL. OPT., 3198–3199 (1992).

In *Acousto-optic Conversion of Laser Beams into Flat-top Beams,* 40 J. MOD. OPTIC., 625–635 (1993), E. Tervonen, A. T. Friberg, and J. Tarunen proposed using crossed acousto-optic cells to convert a single coherent laser beam into a partially coherent field consisting of multiple, non-interfering beams as a way of generating a desired irradiance profile from a coherent light source. The acousto-optic cells were driven by computer-generated waveforms equivalent to one-dimensional array generators, and so can be regarded as synthetic acousto-optic holograms. The approach described by Tervonen et al. produces a desired irradiance profile, but is complex, bulky, expensive, and consumes additional power to drive the acousto-optical cells.

Accordingly, it would be desirable to have an illumination system that can generate a desired irradiance profile from an incoherent light source, and that is simple, compact and energy efficient.

SUMMARY OF THE INVENTION

The invention provides an illumination system for illuminating a surface with a desired irradiance profile. The illumination system comprises a light source, and, disposed in an optical path between the light source and the surface, converging imaging optics, and a diffractive array generator. The diffractive array generator preferably includes a two-dimensional periodic array of multi-level topological features.

The illumination system may alternatively comprise a light source, and, disposed in an optical path between the light source and the surface, a converging element and a diffractive array generator. The converging element forms an image of the light source on the surface. The diffractive array generator diffractively arrays multiple instances of the image of the light source on the surface.

DETAILED DESCRIPTION OF THE INVENTION

Figure 1:
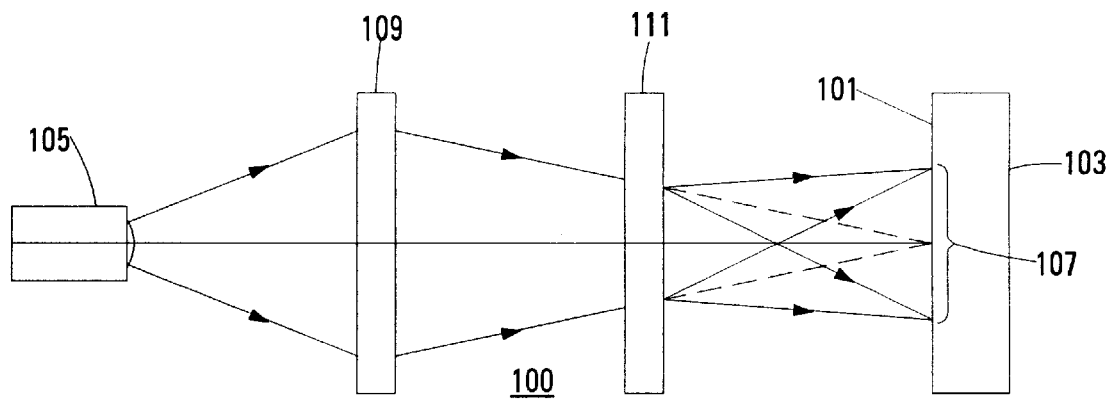
FIG. 1 is a schematic view of an embodiment of the illumination system according to the invention.

FIG. 1 shows a schematic view of an embodiment 100 of the illumination system according to the invention. The illumination system 100 illuminates the surface 101 of the object 103 using light generated by the light source 105. In the embodiment shown, the illumination system illuminates a portion 107 of the surface 101 with a uniform irradiance profile as an example of a "desired" irradiance profile. Other examples of desired irradiance profiles include a sinusoidal irradiance profile, a sawtooth irradiance profile, and a single-Gaussian irradiance profile.

Interposed between the light source 105 and the object 103 in the illumination system 100 are the imaging optics 109 and the diffractive array generator 111. The imaging optics can include diffractive elements, reflective elements, refractive elements, or any combination of diffractive, reflective and refractive elements. The diffractive array generator is shown located between the imaging optics and the object in FIG. 1. However, the diffractive array generator may alternatively be located between the light source and the imaging optics, or, if the imaging optics include more than one element, the diffractive array generator may be located among the elements of the imaging optics.

The imaging optics 109 and the diffractive array generator 111 can be stand-alone optical elements. However, it is preferred that the diffractive array generator be formed in the surface of one of the elements of the imaging optics, since this greatly reduces the amount of alignment required during assembly of the illumination system 100.

The imaging optics 109 converge the light diverging from the light source 105. Without the diffractive array generator 111, the imaging optics would form a single magnified or de-magnified image of the irradiance profile of the light source on the surface 101 of the object 103. The diffractive array generator and the imaging optics together form multiple instances of the magnified or de-magnified image of the light source. Adjacent instances of the image overlap at the surface 101. Due to the spatial incoherence of the light source, the irradiances of the instances of the image simply add in the regions where they overlap.

Figure 2A:
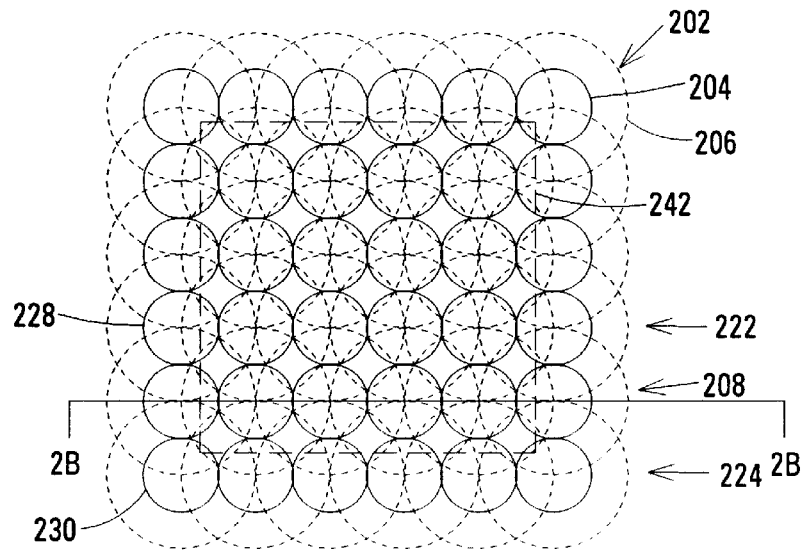
FIG. 2A shows how the illumination system according to the invention arrays multiple instances of an image of the light source on the surface to illuminate the surface with a desired uniform irradiance profile.
Figure 2B:
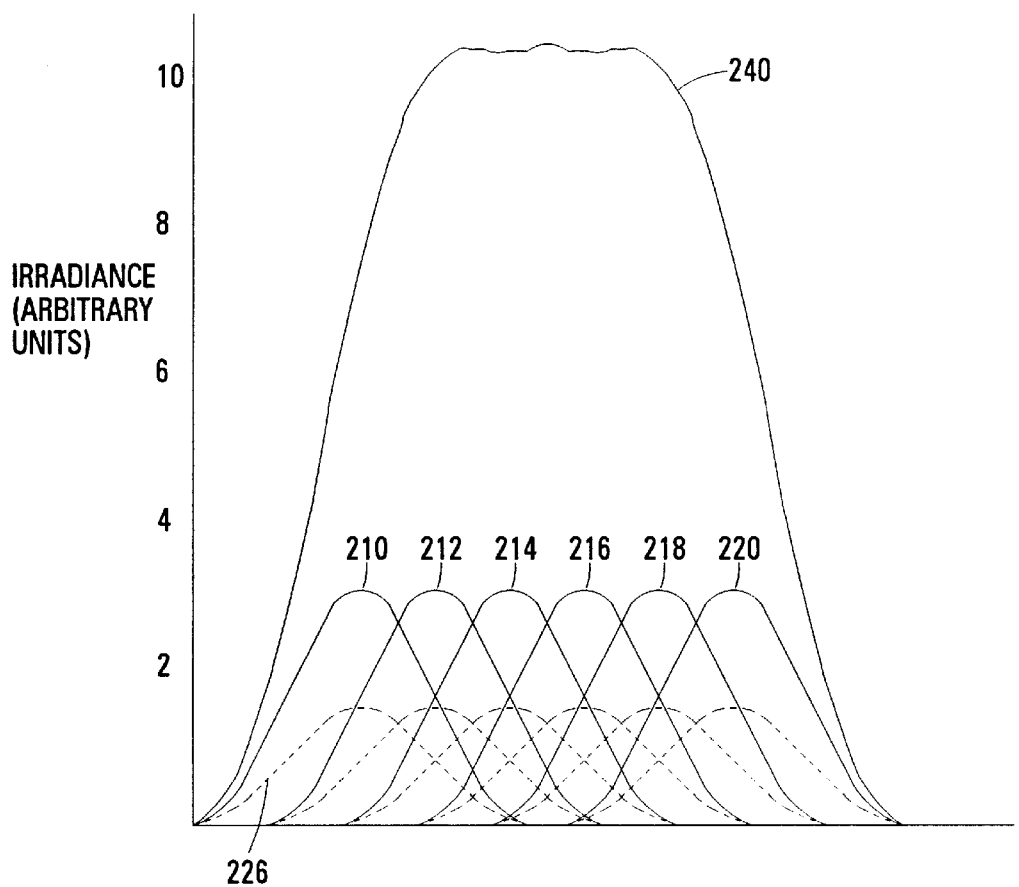
FIG. 2B is a graph illustrating how the non-uniform overlapping irradiance profiles of the instances of the image of the light source add to illuminate the surface with the desired uniform irradiance profile.

An example of an embodiment in which the desired irradiance profile is a uniform irradiance profile is shown in FIGS. 2A and 2B. The diffractive array generator 111 shown in FIG. 1 generates multiple instances of the image of the light source 105, and generates each of the instances with the same irradiance and irradiance profile. FIG. 2A shows a simplified example in which the diffractive array generator generates 36 instances of the image of the light source 105 arranged in a 6×6 array on the surface 101, of the object 103. In practical embodiments, the diffractive array generator would normally generate more instances of the image of the light source so that a larger fraction of the portion 107 of the surface 101 illuminated by the illumination system 100 would be illuminated with the uniform irradiance profile. In one practical embodiment, the diffractive array generator generated a 6×32 array of instances of the image of the light source at the surface 101.

For the sake of illustration, the light source 105 is assumed to have an approximately single-Gaussian irradiance profile, so that each instance 202 of the image of the light source 105 also has an approximately single-Gaussian irradiance profile. In the instance 202, and in all the other instances, the 75% irradiance contour is indicated by the solid line 204, and the 25% irradiance contour is indicated by the broken line 206.

The diffractive array generator 111 offsets each instance of the image of the light source 105 from adjacent instances so that, when the irradiances of the instances add, the desired substantially uniform irradiance profile results. FIG. 2B shows the irradiance profiles 210, 212, 214, 216, 218 and 220 of the row 208 of six instances of the image of the light source 105 disposed along the line 2B—2B in FIG. 2A, and also shows the overall irradiance profile 240 along the line 2B—2B. Contributing to the overall irradiance profile 240 are the irradiance profiles 210, 212, 214, 216, 218 and 220 of the six instances located in the row 208, and the irradiance profiles of the instances located in the rows 222 and 224 located on opposite sides of the row 208. The contribution of the combined irradiance of the instances in the adjacent rows are indicated by broken lines. For example, the broken line 226 indicates the combined irradiance contribution of the instances 228 and 230 located in the rows 222 and 224.

In the example shown in FIG. 2B, the irradiance is uniform over most of the central region inside the boundary indicated by the broken boundary line 242, but drops to about 90% of the maximum irradiance at the boundary. The irradiance is lower in the peripheral region outside the boundary because the peripheral region is illuminated with a lower density of instances.

The diffractive array generator 111 can be designed to illuminate a larger area of the surface 101 of the object 103 than that shown in FIGS. 2A and 2B using the same number of instances of the image of the light source 105. However, the increased area of illumination is obtained at the expense of a lower uniformity of the irradiance profile inside the central region because the overlap of the instances is reduced. Thus, if a larger area of the surface is to be illuminated, the diffractive array generator should also be designed to generate a larger number of instances.

The diffractive array generator 111 can alternatively be designed to generate instances of the image of the light source 105 having unequal irradiance. This makes it possible for the illumination system 100 to illuminate the surface 101 with an irradiance profile different from a uniform irradiance profile. For example, the diffractive array generator can be designed so that the surface 101 is illuminated with a saw-tooth irradiance profile or with a sinusoidal irradiance profile.

The illumination system 100 will now be described in more detail. As noted above, the light source 105 generates light that is spatially incoherent and has a narrow band width. In a preferred embodiment, a resonant-cavity LED was used as the light source 105. Conventional LEDs may alternatively be used.

Examples of structures that integrate the imaging optics and the diffractive array generator are shown in FIGS. 3A–3C and 4A–4C. Both examples provide a compact illumination system that provides a substantially uniform irradiance profile in an area of about 1.25 mm×0.2 mm on the surface 101 of the object 103 with the light source 105 located 10 mm from the surface 101.

Figures 3A, 3B, 3C:
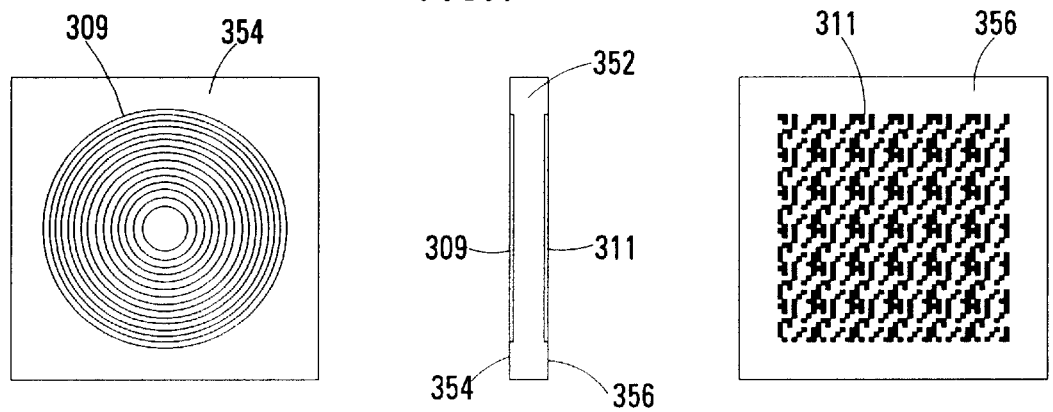
FIGS. 3A, 3B and 3C respectively show front, side and back views of part of an embodiment of the illumination system according to the invention in which the imaging optics are diffractive and the diffractive array generator is formed in a surface of the imaging optics.

In the example shown in FIGS. 3A–3C, diffractive imaging optics, namely, the phase Fresnel zone plate (FZP) 309, and the diffractive array generator 311 are formed in the opposite surfaces 354 and 356 of the quartz wafer 352. The thickness of the quartz wafer 352 defines the relative axial location between the diffractive array generator 311 and the phase FZP 309. In a practical embodiment, the quartz wafer was about 0.5 mm thick. Simple indexing procedures during manufacture define the relative location between the diffractive array generator and the phase FZP in directions orthogonal to the axis. The quartz wafer 352 in which the phase FZP and the diffractive array generator are formed can be used to replace the imaging optics 109 and the diffractive array generator 111 in the embodiment shown in FIG. 1.

The characteristics of the phase FZP 309 and the distances between the light source 105 and phase FZP and between the phase FZP and the surface 101 determine the magnification or de-magnification of the individual instances of the image of the light source at the surface. A phase FZP is merely a staircase approximation to a phase Fresnel lens. The efficiency of the phase FZP increases as the number of phase levels is increased. For example, a two-phase FZP can be shown to have a maximum diffraction efficiency of 40.5%, whereas a four-phase FZP has a maximum diffraction efficiency of 81%. Techniques for designing phase FZPs with the desired characteristics are known in the art and will not be described here. In a practical embodiment, an $f/1$ four-phase FZP with a focal length of about 2.4 mm and a diameter of about 2.5 mm was used.

The phase FZP 309 and the diffractive array generator 311 may be combined in the same surface of the quartz wafer 352. Alternatively, other suitable converging diffractive arrangements may be used instead of the phase FZP as the diffractive imaging optics.

Figures 4A, 4B, 4C:
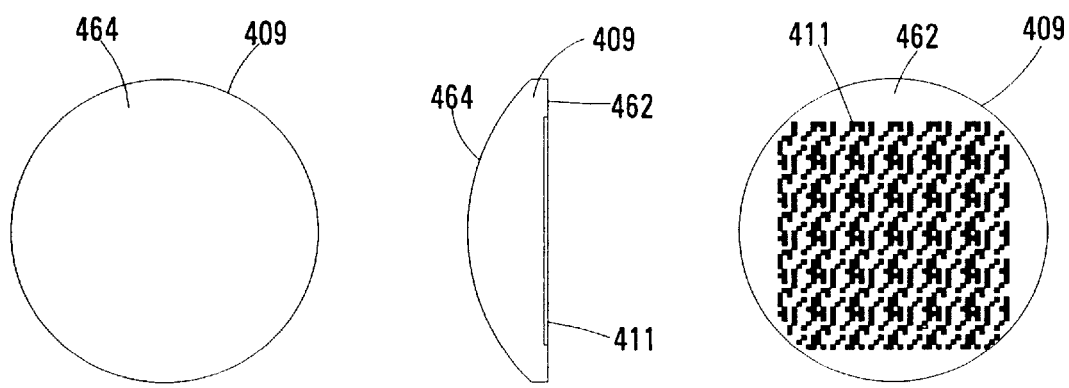
FIGS. 4A, 4B and 4C respectively show front, side and back views of part of an embodiment of the illumination system according to the invention in which the imaging optics are refractive and the diffractive array generator is formed in a surface of the imaging optics.

In the example shown in FIGS. 4A–4C, the convex lens 409 constitutes refractive imaging optics and has the diffractive array generator 411 formed in its surface 462. The surface 462 and the surface 464 of the convex lens 409 may be spherical or aspherical. However, the surface 462 in which the diffractive array generator is formed is preferably plane, as shown in FIG. 4A. The converging characteristics of the convex lens 409 are designed independently of the diffractive array generator to form an image of the light source 105 with a given magnification or de-magnification at the surface 101. The diffractive array generator 411 is then designed to have the desired arraying characteristics, as will be described further below. The convex lens 409 having the diffractive array generator 411 formed in its plane surface can be used to replace the imaging optics 109 and the diffractive array generator 111 in the embodiment shown in FIG. 1.

The convex lens 409 may be made accurately, reproducibly, and inexpensively by making a mold with the required surface geometries, and using the mold to injection mold the lens. The mold includes a surface relief portion in one of its surfaces to form the diffractive array generator 411 in the surface 462 of the molded lens. In a practical embodiment an $f/1$ piano-convex lens with a focal length of about 2.0 mm and a diameter of about 2.0 mm was used.

Figure 5:
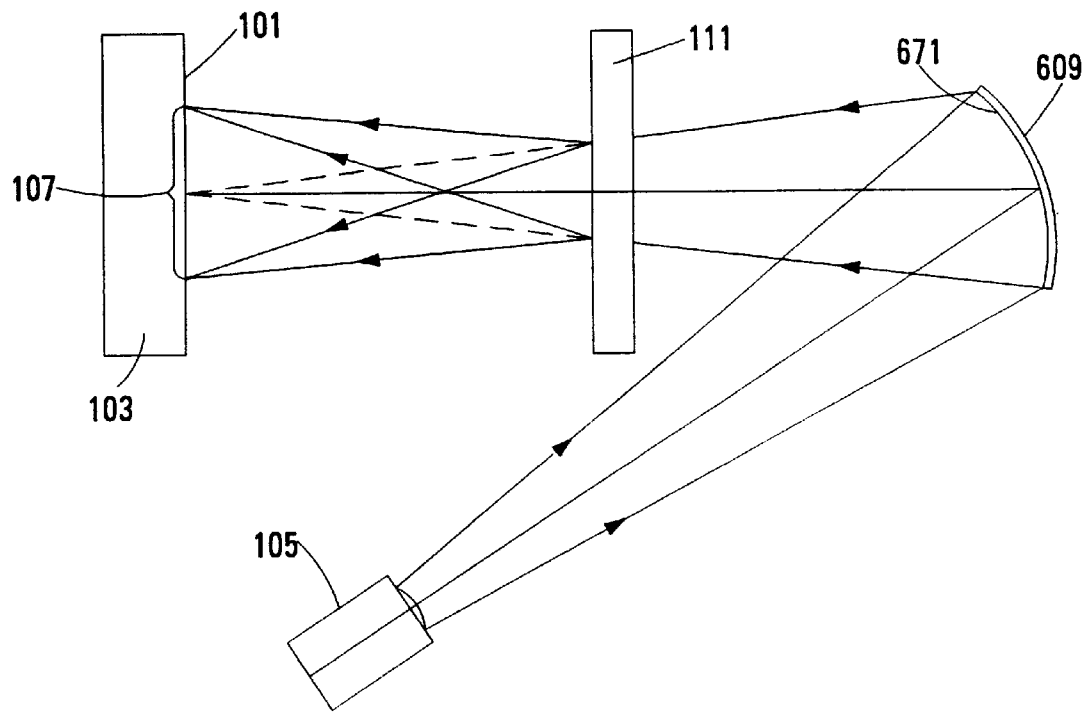
FIG. 5 shows an embodiment of the illumination system according to the invention in which the imaging optics are reflective.

An example of an embodiment of the imaging system in which the imaging optics include a reflective element is shown in FIG. 5. The imaging optics include the concave mirror 609 which reflects the light from the light source 105 back towards the surface 101, and additionally converges the light diverging from the light source to form an image of the irradiance profile of the light source on the surface 101. The concave mirror enables the optical path between the light source 105 and the surface 101 of the object 103 to be folded, which reduces the overall length of the illumination system compared with the embodiment shown in FIG. 1. The reflective surface 671 of the concave mirror can be spherical or aspherical. The remaining elements of the embodiment shown in FIG. 5 correspond to elements of the embodiment shown in FIG. 1 and are indicated by the same reference numerals, so they will not be described again here.

The diffractive array generators such as the diffractive array generator 111 will now be described in more detail. The surface array generators are typically designed using a computer. Suitable computer-aided design procedures are described by A. Vasara, M. R. Taghizadeh, J. Turunen, J. Westerholm, E. Noponen, H. Ichikawa, J. M. Miller, T. Jaakkola and S. Kuisma in *Binary Surface-relief Gratings for Array Illumination in Digital Optics,* 31 APPL. OPT. 3320–3336 (1992), and by M. R. Feldman and C. C. Guest in *Iterative Encoding of High-efficiency Holograms for Generation of Spot Arrays,* 14 OPT. LETT., 479–481 (1989), the disclosures of which are incorporated in this disclosure by reference.

Figure 6:
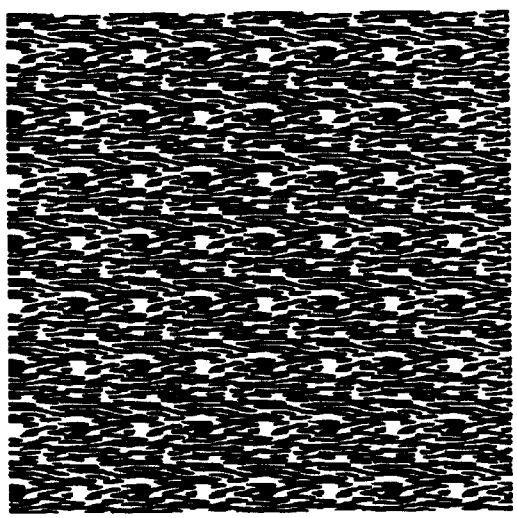
FIG. 6 shows a mask used to make the diffractive array generator of the illumination system according to the invention.

The diffractive array generators have a surface in which is formed a thin surface-relief topology that is periodic in two orthogonal directions. An example of the mask that was used to fabricate an embodiment of a two-level diffractive array generator is shown in FIG. 6. In this, one of the two levels of the surface of the mask is colored black and the other of the two levels is left uncolored.

The period of the surface-relief topology in each direction of the array generators, the center wavelength of the light generated by the light source 105, and the characteristics of the imaging optics, if any, located between the diffractive array generator and the surface 101 determine the spacing between the adjacent instances of the image of the light source 105 on the surface 101. In the illumination system 100, in which the magnification or de-magnification of the image of the light source at the surface 101 is fixed, the sizes of the periods of the surface-relief topology of the diffractive array generator are set to guarantee that the instances of the image of the light source overlap at the surface 101. Reducing the period of the surface-relief topology in each direction increases the separation between the instances of the image of the light source. The complexity of the fine structure of the surface-relief topology, the depth of the surface-relief topology, the material of the diffractive array generator, together with the intensity of the light generated by the light source 105, determine the amount of power in each of the instances of the image of the light source, assuming that the amount of power is not limited by aberrations in the imaging optics.

Irrespective of whether the diffractive array generator is a stand-alone optical element, or is integrated with diffractive imaging optics or with refractive imaging optics, the diffractive array generator is preferably fabricated by making a mask that defines the required topological features. The mask is then used to fabricate a master in a substrate of a suitable material such as fused quartz, silicon, or metal. A suitable technique for fabricating the master using binary optics is described in U.S. Pat. No. 5,218,471, the disclosure of which is incorporated in this disclosure by reference. The master has a multi-level surface relief formed in the surface of the substrate. The dimensions of the individual topological features formed in the substrate are generally less than one micron in directions both parallel and orthogonal to the surface of the substrate.

If the desired irradiance profile on the surface 101 of the object 103 contains the symmetry $I(x, y)=I(-x, -y)$, where $I(x, y)$ is the irradiance at the point x, y on the surface 101, then the diffractive array generator can have two-level topological features. Since one of the two levels is the surface of the substrate, the master for making such a diffractive array generator is easy to make since only one etching operation is required. Two-level array generators can be routinely designed with diffraction efficiencies of over 70%. If the desired irradiance profile is asymmetrical, or if even greater efficiency is needed, topological features having more than two levels are required.

The master, or a robust copy derived from the master, can be used to generate stand-alone replicas of the master using embossing, casting, or injection molding. Alternatively, the master or a robust copy of the master can be used to form one of the elements of the imaging optics with a diffractive surface, as described above.

Although this disclosure describes illustrative embodiments of the invention in detail, it is to be understood that the invention is not limited to the precise embodiments described, and that various modifications may be practiced within the scope of the invention defined by the appended claims.

We claim:

1. An illumination system for illuminating a surface with a desired irradiance pattern, the illumination system comprising:
   a light source; and
   disposed in an optical path between the light source and the surface:
      a non-imaging diffractive array generator, and
      converging imaging optics structured to form, absent the diffractive array generator, one and only one image of the light source on the surface.

2. The illumination system of claim 1, in which the diffractive array generator includes a two-dimensional periodic array of multi-level topological features.

3. The illumination system of claim 2, in which the topological features of the diffractive array generator have no more than two levels.

4. The illumination system of claim 2, in which the topological features of the diffractive array generator have more than two levels.

5. The illumination system of claim 2, in which the converging imaging optics include a diffractive element.

6. The illumination system of claim 2, in which the converging imaging optics include a refractive element.

7. The illumination system of claim 2, in which the converging imaging optics include a reflective element.

8. The illumination system of claim 2, in which:
   the converging imaging optics include a surface disposed in the optical path; and
   the diffractive array generator is formed in the surface of the converging imaging optics.

9. The illumination system of claim 8, in which:
   the converging imaging optics include a phase Fresnel zone plate formed in a first surface of a wafer, the wafer having a second surface opposite the first surface; and
   the diffractive array generator is formed in the second surface of the wafer.

10. The illumination system of claim 8, in which:
   the converging imaging optics include a convex lens having a surface disposed in the optical path; and
   the diffractive array generator is formed in the surface of the convex lens.

11. The illumination system of claim 1, in which the converging imaging optics include a diffractive element.

12. The illumination system of claim 1, in which the converging imaging optics include a refractive element.

13. The illumination system of claim 1, in which the converging imaging optics include a reflective element.

14. The illumination system of claim 1, in which:
   the converging imaging optics include a surface disposed in the optical path; and
   the diffractive array generator is formed in the surface of the converging imaging optics.

15. The illumination system of claim 14, in which:
   the converging imaging optics include a phase Fresnel zone plate formed in a first surface of a wafer, the wafer having a second surface opposite the first surface; and
   the diffractive array generator is formed in the second surface of the wafer.

16. The illumination system of claim 14, in which:
   the converging imaging optics include a phase Fresnel zone plate formed in a surface of a wafer; and
   the diffractive array generator is additionally formed in the surface of the wafer.

17. The illumination system of claim 14, in which:
   the converging imaging optics include a convex lens having a surface located in the optical path; and
   the diffractive array generator is formed in the surface of the convex lens.

18. An illumination system for illuminating a surface, the illumination system comprising:
   a light source; and
   disposed in an optical path between the light source and the surface:
      converging means for forming an image of the light source on the surface, and
      diffractive array generator means for diffractively arraying multiple instances of the image of the light source on the surface.

19. The illumination system of claim 18, in which the diffractive array generator means includes a two-dimensional periodic array of multi-level topological features.

20. The illumination system of claim 18, in which:
   the converging means includes a surface disposed in the optical path; and the diffractive array generator means is formed in the surface of the converging means.

* * * * *